United States Patent
Miller

(10) Patent No.: US 6,856,693 B2
(45) Date of Patent: Feb. 15, 2005

(54) WATERMARKING WITH CONE-FOREST DETECTION REGIONS

(75) Inventor: Matthew L. Miller, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 695 days.

(21) Appl. No.: 09/971,893

(22) Filed: Oct. 9, 2001

(65) Prior Publication Data

US 2004/0028255 A1 Feb. 12, 2004

Related U.S. Application Data

(60) Provisional application No. 60/258,181, filed on Dec. 22, 2000.

(51) Int. Cl.$^7$ ................................................. H04K 1/00
(52) U.S. Cl. ........................................ 382/100; 341/82
(58) Field of Search ................................ 382/100, 232; 380/210, 252, 287, 54; 713/176; 381/73.1; 704/200.1, 273; 341/50, 51, 82, 88

(56) References Cited

U.S. PATENT DOCUMENTS

| | | | | |
|---|---|---|---|---|
| 6,128,736 A | * | 10/2000 | Miller | .......................... 713/176 |
| 6,307,949 B1 | * | 10/2001 | Rhoads | ........................ 382/100 |
| 6,381,341 B1 | * | 4/2002 | Rhoads | ........................ 382/100 |

OTHER PUBLICATIONS

Chen, B. et al., "Dither Modulation: A New Approach to Digital Watermarking and Information Embedding", *Proceedings of the SPIE: Security and Watermarking of Multimedia Contents*, vol. 3657, pp. 342–353, 1999.

Moulin, P. et al., "Information–Theoretic Analysis of Information Hiding", *IEEE International Symposium on Information Theory*, Boston, MA, Aug. 1998.

Chou, J. et al., "On the Duality Between Distributed Source Coding and Data Hiding", *Proceedings of Asilomar Converence*, Nov. 1999.

Ramkumar, M., "Data Hiding in Multimedia—Theory and Applications", Ph.D Thesis, New Jersey Institute of Technology, Kearny, NJ, Nov. 1999.

Eggers, J. et al., "A Blind Watermarking Scheme Based on Structured Codebooks", *JEE Secure Images and Image Authentication*, London, UK, pp. 4/1–4/6, Apr. 2000.

Cox, I.J. et al., "Watermarking as Communications with Side Information", *Proceedings of the IEEE*, vol. 87, No. 7, pp. 1127–1141, Jul. 1999.

Shannon, C.E., "Channels with Side Information at the Transmitter", *IBM Journal of Research and Development*, pp. 289–293, 1958.

Miller, M.L. et al., "Informed Embedding: Exploiting Image and Detector Information During Watermark Insertion", IEEE International Conference on Image Processing, Sep. 2000.

Cox, I.J. et al., "A Review of Watermarking and the Importance of Perceptual Modeling", *Proceedings of SPIE, Human Vision and Electronic Imaging II*, vol. 3016, pp. 92–99, 1997.

Costa, M., "Writing on Dirty Paper", *IEEE Transactions on Information Theory*, vol. 29, No. 3, pp. 439–441, 1983.

Pradhan, S.S. et al., "Distributed Source Coding Using Syndromes (DISCUS): Design and Construction", *Proceedings of the Data Compression Conference (DCC)*. Mar. 1999.

Miller, M.L. et al., "Computing the Probability of False Watermark Detection", *Proceedings of the Third International Workshop on Information Hiding*, Dresden, Germany, 1999.

* cited by examiner

Primary Examiner—Andrew W. Johns

(57) ABSTRACT

In a watermarking system, an embedder embeds one of several alternative watermark patterns that represent the source message using side information to improve robustness. A detector uses normalized correlation to test all of the patterns, indicating that the source message is present if any one of the patterns is detected. The detection process results in a detection region that is the union of several disjoint cones, or a cone-forest, in media space.

36 Claims, 5 Drawing Sheets

WATERMARKING WITH CONE-FOREST DETECTION REGIONS

CROSS-REFERENCE TO RELATED APPLICATIONS

This application claims priority on U.S. Provisional Application Ser. No. 60/258,181, filed Dec. 22, 2000. The contents of the provisional application is hereby incorporated herein by reference.

FIELD OF THE INVENTION

The present invention concerns digital watermarking. Specifically, the invention relies upon encoding a watermark using a one-to-many, or "dirty-paper" code for the watermark pattern where a single source message can be represented by a plurality of watermark patterns. The decoding of the watermark relies upon correlation detection.

BACKGROUND OF THE INVENTION

In recent years, researchers have recognized that watermarking can be viewed as communication with side-information at the transmitter, as first studied by C. E. Shannon and described in an article entitled "Channels with Side Information at the Transmitter," *IBM Journal of Research and Development*, pages 289–293, 1958. This view of watermarking is illustrated in FIG. 1. The watermark embedding process is divided into two steps. In the first step a source message is encoded as a watermark pattern, w, and in the second step, the pattern is added to a cover Work, I, to produce the watermarked Work, I'. The encoding process is equivalent to a transmitter in a communication system. The addition of the cover Work is equivalent to a noise source in the transmission channel. The transmitter has access to this noise source (cover Work), which represents "side-information" that it may exploit during coding.

It shall be understood by those skilled in the art that the term "Work" as used herein includes any media object, such as an image, an audio clip, a three-dimensional model, and the like.

Research based on this side-information view of watermarking has followed at least two distinct paths. In the research path described in I. J. Cox et al., in an article entitled "Watermarking as Communications with Side Information," *Proceedings of the IEEE*, 87(7), pages 1127–1141, 1999 and M. L. Miller et al., in an article entitled "Informed Embedding: Exploiting Image and Detector Information During Watermark Insertion," *IEEE International Conference on Image Processing*, September 2000, novel embedding algorithms use the side information to improve the robustness of watermarks that will be detected by conventional, normalized-correlation detectors. The principal justification for these detectors is that they are immune to changes in the amplitude of the watermarked Work, such as occur when audio volume is turned down, or image contrast is adjusted.

The other research path as described by B. Chen et al. in an article entitled "Dither Modulation: a New Approach to Digital Watermarking and Information Embedding," *Proceedings of SPIE, Security and Watermarking of Multimedia Contents*, volume 3657, January 1999; J. Chou et al. in an article entitled "On the Duality Between Distributed Source Coding and Data Hiding," *Proceedings of Asilomar Conference*, November 1999; M. Ramkumar in article entitled "Data Hiding in Multimedia: Theory and Applications" Ph.D. Thesis, New Jersey Institute of Technology, Kearny, N.J., USA, November 1999; and J. J. Eggers et al. in an article entitled "A Blind Watermarking Scheme Based on Structured Codebooks," *IEE Seminar, Secure Images and Image Authentication*, pages 4/1–4/6, 2000 introduces novel embedders and detectors that significantly increase the data payload of robust watermarks. A central characteristic of these systems is the use of multiple, alternative encodings for each possible message. However, most of these designs ignore the problem of changes in amplitude.

In most early watermark embedding algorithms, such as those described in I. J. Cox et al, "A Review of Watermarking and the Importance of Perceptual Modeling," *Proceedings of SPIE: Human Vision and Electronic Imaging II*, volume 3016, pages 92–99, 1997, the cover Work was ignored during the process of encoding a message. Later algorithms used perceptual modeling to adaptively attenuate the watermark pattern, making it less perceptible, but still ignored the position of the Work relative to the detection region in media space. When the resulting watermark patterns were added to the original Work, the patterns would not necessarily produce watermarked images inside the detection region.

The two paths of research described above that form the background of the present invention both stem from the realization that the cover Work need not be ignored during coding.

Once the encoder need not ignore the cover Work, it is possible to have complete control over the embedder output, since the encoder can set the watermark pattern to the difference between a desired output watermarked Work I' and the original cover Work I, w=I'−I. If the detector is fixed, then the problem of embedding becomes one of choosing the best point, I, within the detection region for the desired message.

In Miller et al. supra, the detector was assumed to employ normalized-correlation or correlation-coefficient as a detection metric. These closely-related metrics are commonly used in watermark detection because the normalization step makes them independent of scaling, such as occurs when image contrast is adjusted.

Under the assumption of a normalized-correlation detector, Miller et al. supra explored four different strategies for choosing I'. The two strategies with the best performance involved a robustness measure, $r^2$, first described in Cox et al. supra. This value estimates the amount of I.I.D (independent, identically distributed) Gaussian noise that may be added to the watermarked image, I, before it is likely to go outside the detection region. The value $r^2$ is given by $$r^2 = \left(\frac{v \cdot w}{T|w|}\right) - v \cdot v,$$

where v is a vector extracted from a watermarked Work, w is a watermark pattern, and T is a constant. One strategy was to maximize $r^2$ while maintaining a constant distance (fidelity) between I and I'. The other strategy was to minimize the distance between I and I' while maintaining a constant value of $r^2$.

The strategy of keeping $r^2$ constant produced the most consistently robust watermarks. However, this consistent robustness came at a cost of inconsistent fidelity.

Most of the research based on the side-information view of watermarking has concentrated on increasing data payload. This was inspired by the article by M. Costa, "Writing on Dirty Paper," *IEEE Transactions on Information Theory*, Vol. 29, No. 3, pages 439–441, May 1983, studied a channel like that shown in FIG. 1. He found that, if the two noise sources (cover images I and processing noise n, in the case of watermarking) are both I.I.D. Gaussian, and the transmitted signal, w, is limited by a power constraint, then the capacity of the channel is dependent only on the second noise source. Since the data payload of most proposed watermarking systems is severely limited by interference from cover images, Costa's results implies that their performance can be greatly improved upon.

Costa showed that the capacity of his communications channel could be approached using what can be called a one-to-many or dirty-paper code. In such a code, there is a one-to-many mapping between messages and code vectors. From amongst the many vectors that encode a single, desired message, the encoder selects a vector, u, based on the value that will be added from the first noise source, I. In Costa's construction, the encoder transmits w=u−αI, where α is a constant between 0 and 1. To decode a received signal, the receiver finds the closest code vector, u, and identifies the message to which it corresponds. With a properly-designed code book, and a carefully selected value of α, w is virtually guaranteed to satisfy the power constraint, and the code rate can approach channel capacity.

Realizing Costa's result in practice presents a major problem. If one wishes to have data payloads in the hundreds or thousands of bits, the size of the code is far too large to be implemented with brute-force searches. Some form of structured code must be used that allows the closest code vector to a given vector to be found efficiently. Several researchers have suggested using lattice codes, with each message represented by a sub-lattice. Chou et al. supra describe an alternative method based on the syndrome coding ideas of Pradhan et al., "Distributed Source Coding Using Syndromes: Design and Construction," *Proceedings of the Data Compression Conference (DCC)*, March 1999.

In principle, an increase in data payload can be traded off for an increase in robustness, and vice-versa. Consider the following four properties of a watermark:

Robustness (ability to survive normal processing)

Fidelity (perceptual distance between original and watermarked version of a image)

False positive probability (probability that a watermark will be detected in an unwatermarked image)

Data payload ($\log_2$ of the number of distinct watermark messages that can be embedded and detected)

In general, it is possible to trade any of these properties for any other. For example, suppose there is a system that detects a watermark in every image, so its false positive probability is 100%, but the watermarks have a high data payload, say 1024 bits. In such a system, it is possible to improve the false positive rate at the expense of data payload by specifying that the last 24 bits of every message must be 1's—a message with any other combination of final bits indicates that no watermark is present. If, in an unwatermarked image, each bit has an even probability of being a 1 or a 0, and the bits are independent, then this gives a false positive probability of $2^{-24}$, with a data payload of 1000 bits.

In principle, it is possible to also trade false positive probability to gain data payload. Consider a system that has 0 bits of data payload, in the sense that there is only one message that may be embedded, and the detector simply reports whether the watermark is present or not. Suppose the detection region covers $\frac{1}{2}^{24}$th of the distribution of unwatermarked images, giving a false positive probability of $2^{-24}$. In theory, it is possible to define $2^{24}$ similarly-shaped, non-overlapping detection regions to obtain a watermarking system with 24 bits of data payload but 100% false positive probability.

Similarly, false positive probability can be traded for robustness, by increasing the size of the detection region. With a normalized-correlation detector, this is a simple matter of lowering the detection threshold. And the robustness and fidelity can also be traded for one another, by varying how far the embedder moves Works into the detection region.

Thus, an improvement in any one of these four areas can, in principle, translate into an improvement in one of the others. Specifically, if an existing watermarking system is modified to exploit an idea designed to improve data payload, but to hold the data payload constant, it should be expected that one or more of the other properties improves.

The key idea behind Costa's result is the use of a one-to-many code. Costa's actual codes and communications algorithms are designed for a channel in which both noise sources are I.I.D. Gaussian, which is not the case in most watermarking systems.

Each cover Work I may be considered as a point in a K-dimensional media space. With respect to a given watermark pattern w, the watermark detector defines a detection region, which is the set of all points that the detector will categorize as containing that message. When a watermark embedder embeds a source message in a cover Work, the embedder attempts to find a new Work that is perceptually similar to the cover Work, but that lies within the detection region for the source message.

A novel aspect of the present invention is that a source message can be represented by a quantity of alternative watermark patterns. The embedder embeds whichever of these patterns most closely resembles the cover Work so that the most relevant watermark message is used. The detector reports that the source message was embedded if any one of the alternative watermark patterns is detected.

The present invention combines ideas from the two research paths described above in a simple image watermarking system. Specifically, the systems examined here are based on one described in Miller et al. supra, which uses normalized correlation in the detector, and employs side information to improve robustness.

A principal object of the present invention is therefore, the provision of a watermarking method where the encoding of the watermark pattern into a cover Work uses a one-to-many or dirty-paper code for the watermark pattern such that a single source message can be represented by a plurality of watermark patterns.

Another object of the present invention is the provision of a watermarking method where "side-information" is used in the embedding process.

A further object of the present invention is the provision of a watermarking method wherein the decoding of the watermark relies upon correlation coefficients.

Further and still other objects of the present invention will be more clearly understood when the following description is read in conjunction with the accompanying drawings.

DETAILED DESCRIPTION

Figure 1:
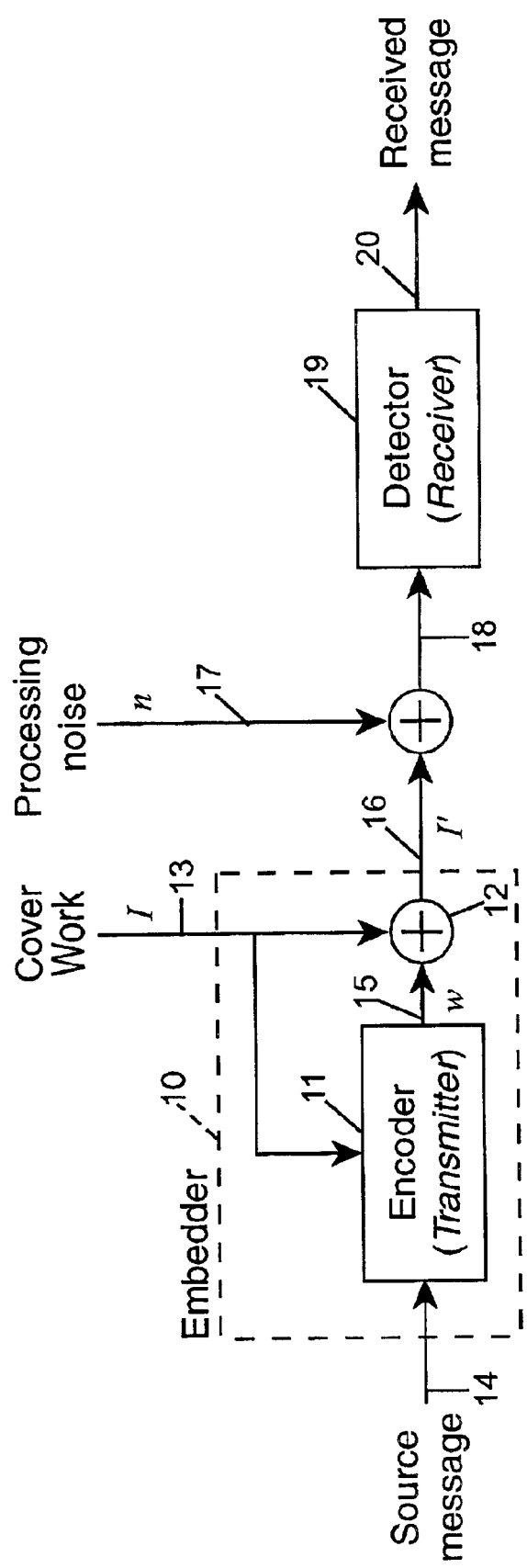
FIG. 1 is a schematic representation of a watermarking system as a communications system with side information at the transmitter.

Referring now to the figures, and in particular to FIG. 1, there is shown schematically a communication system for use in watermarking applications, embedder 10 includes an encoder (transmitter) 11 and a combiner 12. A cover Work 13 into which a source message 14 is to be embedded is provided as an input to encoder 11 and to combiner 12. The source message 14 is provided as an input to encoder 11.

The source message corresponds to a set of different patterns which each represents the same message of a dirty-paper code. The encoder 11 calculates which of the different patterns 15, w, is to be embedded by combiner 12 into the cover image 13 in order to provide the most robust watermarked Work 16, I'.

The watermarked Work 16, is combined with some processing noise 17, n, which is inherent in any communication system. The watermarked Work including processing noise 18 is provided as the input to detector 19. The detector 19 uses correlation coefficient to determine if any of the plurality of patterns representing a source message is present. If the detector records the presence of the patterns, the source message is reported as being present as the received message 20.

In accordance with the teaching of the present invention, two image watermarking systems, of essentially the same form, will now be described. The first system is the same as the constant-robustness system presented in Miller et al. supra, with the important distinction that a single watermark can be represented by a plurality of code vectors, preferably between 1 and 1024 code vectors (i.e., a dirty-paper code.) In the preferred embodiment each reference vector is a 64-dimensional watermark vector. The second system is the same as the first, except that it employs lower-frequency watermark reference patterns.

In a preferred embodiment, the detector 19 for each of the two systems performs the following steps:

1. Extract a 64-dimensional watermark vector from the input image 18 by correlating the image against 64 predefined, orthogonal reference patterns.
2. Compute the correlation coefficient between the extracted watermark vector and each of a set of code vectors. The number of code vectors preferably is selected between 1 and 1024 (one-to-many code). Each code vector is drawn from an I.I.D Gaussian distribution.
3. If the maximum correlation coefficient computed in step 2 is equal to or greater than a predetermined threshold, then the detector will report that the watermark is present. Otherwise, the detector will report that the watermark is absent.

Alternatively, the extraction process described in step 1 may be replaced by other extraction processes, such as extracting a vector of phases from the Fourier transform, or projecting the Fourier-Mellin transform of the image into a single vector. In addition, the correlation coefficient in steps 2 and 3 may be replaced with other detection values, such as normalized correlation, linear correlation, or phase-only correlation. It being understood that the invention is not limited to these specific methods which are provided as examples of the methods which may be used.

Figure 2:
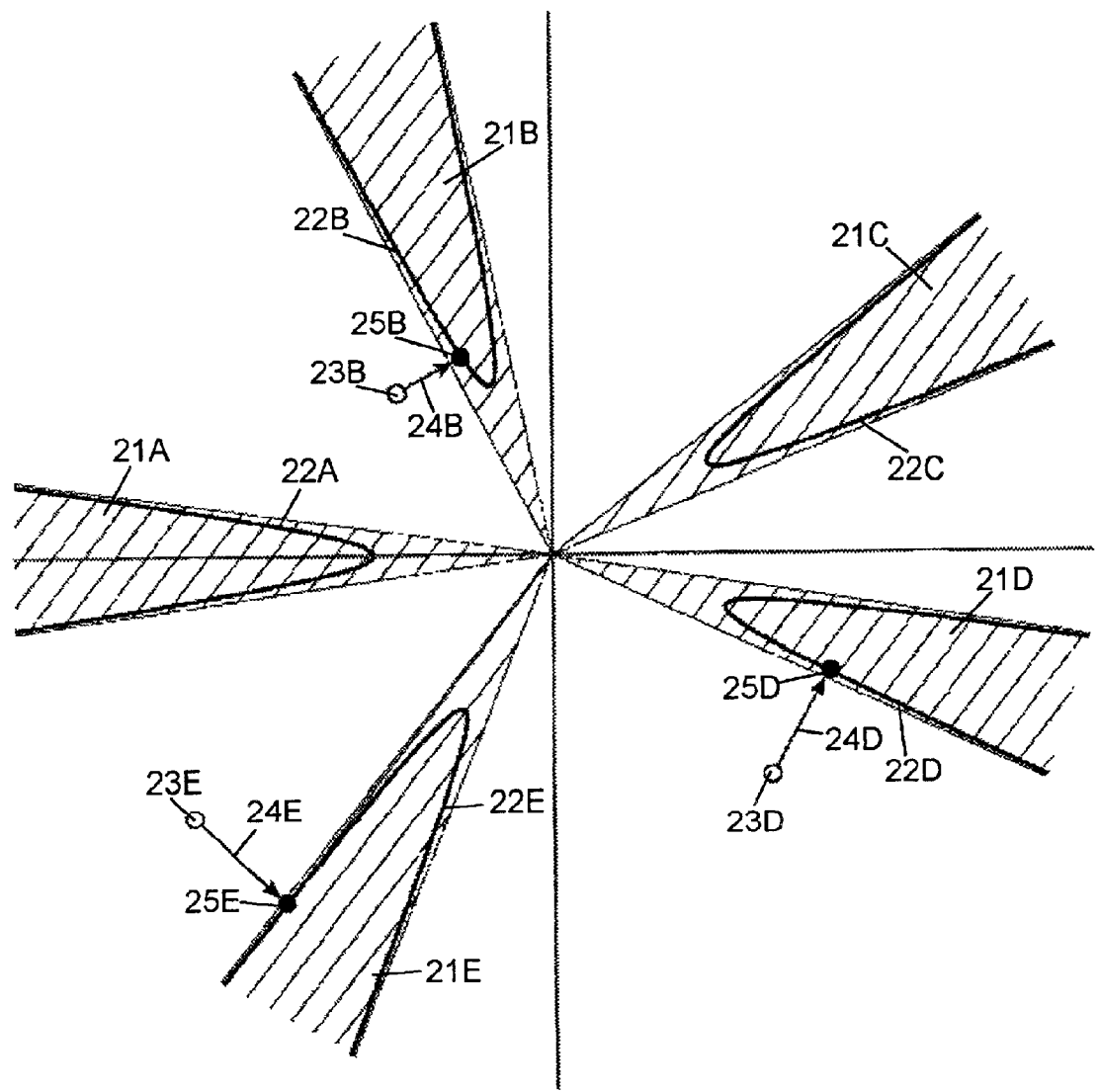
FIG. 2 is a schematic illustration of a cone-forest detection region.

Using correlation coefficient, this detection algorithm leads to a detection region that is a forest of cones in 63-dimensional space. FIG. 2 schematically illustrates the detection region in two dimensions. The shaded areas 21A–21E represent the detection cones for five different code vectors. If the extracted watermark vector lies within any of these cones, the watermark is present. The curves 22A–22E within the cones indicate contours of constant $r^2$. The open circles 23B, 23D and 23E indicate vectors extracted from unwatermarked images. The arrows 24B, 24D, and 24E and closed circles 25B, 25D, and 25E show the effect of the embedding algorithm described below.

The dimensionality of the cone-forest is 63 rather than 64 because of the use of correlation coefficients, which subtract out the means of vectors before computing their normalized correlation. This subtraction reduces the dimensionality of the cones by 1.

The embedder for each of the two systems performs the following steps:

1. Extract a 64-dimensional watermark vector from the cover Work 13 by correlating the image against the same 64 reference patterns used in the detector 19.
2. Compute the correlation coefficient between the extracted watermark vector and each of the code vectors to identify the code vectors that yields the highest correlation.
3. Using the constant-robustness mixing algorithm described in Miller et al. supra (which is incorporated herein by reference), find a point in 63-dimensional space that lies within the detection cone around the code vector identified in step 2.
4. Invert the extraction process by scaling each of the 64 reference patterns by the difference between the corresponding element of the original extracted vector and the mixed vector found in step 3, and adding the resulting scaled patterns to the cover Work. This results in a watermarked Work that will yield the mixed vector when projected back into the 64-dimensional space.

If the extraction process in the detector is other than correlating the image with 64 patterns, then step 1 of the embedder must use the detector's extraction process. In addition, the inverse extraction process of step 4 must be made to match. An inverse extraction process, $X^{-1}(C_o, V_w)$, yields a new Work, $C_w$, such that $C_w$ is as perceptually close as practical to a given Work $C_o$, and vector $V_w$ is obtained when an extraction process, $X(C_w)$, is applied to $C_w$. Two works are "perceptually close" if the difference between them will not be noticed by a casual observer. Two vectors, $V_w$ and $V_o$, are "perceptually close with respect to a work $C_o$," if $X^{-1}(C_o, V_w)$ is perceptually close to $X^{-1}(C_o, V_o)$.

FIG. 2 schematically illustrates the effect of this embedding algorithm on several hypothetical images. The open circles represent vectors projected from these images. The closed circles represent the results of mixing. Note that each projected vector gets moved to the closest point on the closest contour of constant $r^2$.

The preferred design of the mixing algorithm used in step 3 is to maintain constant robustness. In this strategy, the user specifies a desired robustness measure, rather than a maximum acceptable distortion. The mixing algorithm examines points that all have the given robustness measure, and chooses the point that is closest to the extracted signal in step 1 above. In the preferred implementation, this choice is made by the following exhaustive search:

First, the extracted vector v and the code vector identified in step 2, w are projected into a two-dimensional plane. The axes X, Y of the plane are given by $$X = \frac{w}{|w|}$$

$$Y = \frac{v - X(v \cdot X)}{|v - X(v \cdot X)|}$$

where $$v \cdot X = \sum_i v_i X_i$$

is the inner product of v and X, and $|w|=\sqrt{w \cdot w}$ is the magnitude of w. The coordinates of w and v in this plane are given by $$x_w=1 \quad y_w=0$$

$$x_v=v \cdot X \quad y_v=v \cdot Y$$

Next, for several values of y between 0 and $y_v$, find $$x = \sqrt{\frac{T^2(r^2 - y^2)}{1 - T^2}}$$

where T is the detection threshold, and $r^2$ is the desired robustness value. For each such x, y pair, compute the Euclidian distance between x, y and $x_v$, $y_v$, and let $x_m$, $y_m$ equal the pair that yields the smallest distance. Finally, compute the mixed vector, $v_m$, as $$v_m = x_m X + y_m Y.$$

The difference between the two image watermarking systems described is in the set of 64 orthogonal reference patterns used to extract watermark vectors. In the disjoint pixel (DJP) system, each of the patterns consists of 0's, 1's, and −1's. Only one pattern is non-zero at any given pixel location, thus guaranteeing orthogonality. These are the patterns used in Miller et al. supra.

In the low-frequency (LF) system, the patterns are bandlimited to have energy only in fairly low frequencies (e.g., at frequencies below approximately 4 cycles per degree at a viewing distance of 4 times the image height). In experiments, the patterns were made orthogonal by Gram-Schmidt orthonormalization. This set of patterns leads to watermarks that are much more robust than those in Miller et al. supra, but are, in general, more visible.

The tests performed maintained data payload, false positive probability, and robustness constant while the number of code vectors changed. The fidelity was allowed to vary.

The data payload was held constant at one message. That is: the watermark is either present or it is absent.

The false probability was held approximately constant at $10^{-6}$. This required a different detection threshold for each quantity of code vectors. When there is only 1 code vector, the false positive probability for a give threshold can be estimated using the formula in M. L. Miller et al., "Computing the Probability of False Watermark Detection," *Proceedings of the Third International Workshop on Information Hiding*, 1999. A simple search then yields a threshold with a false positive probability of $10^{-6}$. When there are N>1 code vectors, the false positive probability has an upper bound of N times the probability of any one code vector generating a false positive. This bound is tight at low false positive probability, so, for N code vectors, the threshold used is the one with a false positive probability of $10^{-6}/N$.

The robustness is held approximately constant by using the same value of $r^2$ during embedding, regardless of the number of code vectors or the detection threshold. As the number of code vectors increases, and the detection threshold goes up accordingly, the contours of constant robustness move farther and farther from the origin.

Watermarks were embedded in two thousand images using eight different quantities of code vectors: 1, 2, 16, 64, 128, 256, 512 and 1024. The detection thresholds were 0.5544, 0.5676, 0.6042, 0.6262, 0.6366, 0.6467, 0.6563, and 0.6657, respectively. The value of $r^2$ was held at 5000. The images were randomly selected from Corel Stock Photo Library.

Figure 3:
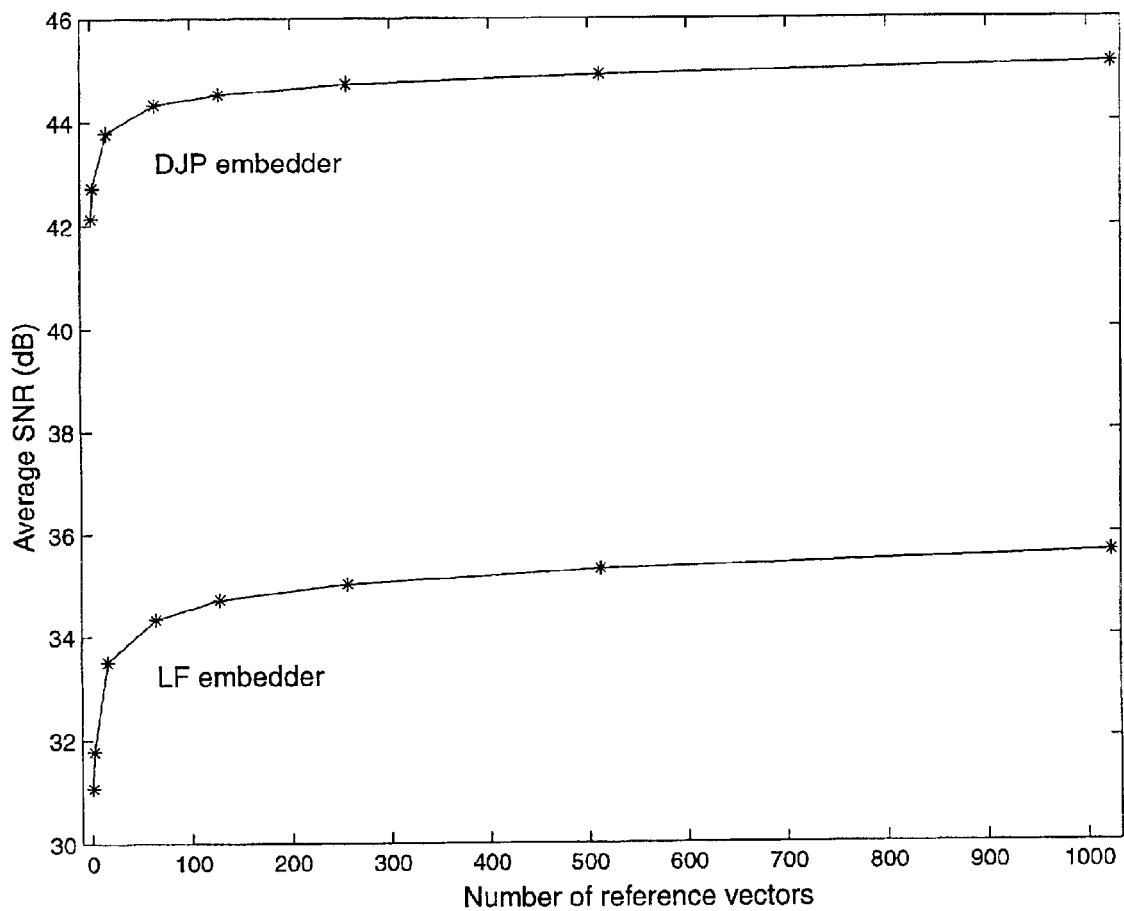
FIG. 3 is a graph of test results obtained with two versions of the present invention.

FIG. 3 shows the average signal-to-noise ratios (SNR's) of watermarked images for the DJP and LF embedders as a function of the number of code vectors. The cover Work is considered the "signal" and the pattern added by the watermark embedder 10 is the "noise". SNR is well-known to be a poor measure of perceptual fidelity because it does not consider variation in the perceptibility of different patterns. However, as long as the watermark patterns are all similar to one another, SNR can provide a good measure of relative fidelity. In this case, the watermark patterns added to cover images by the DJP embedder are all qualitatively similar to one another and the patterns added by the LF embedder are also similar to one another. Thus, the change in SNR as a function of number of the code vectors is a reasonable indication of relative change in fidelity.

The results indicate that increasing the number of code vectors improves fidelity. In the case of the DJP embedder, SNR is improved by nearly 3 dB as the number of vectors goes from 1 to 1024. While this improvement is significant, the fidelity with 1 vector was already acceptable, because (a) the SNR was already fairly high (more than 42 dB), and (b) the high-frequency watermark patterns embedded by the DJP algorithm are not very visible. However, because the high-frequency watermark patterns have so much high-frequency energy, these watermarks are not very robust.

Figure 4A:
FIG. 4A is an image embedded using low-frequency patterns with one code vector.
Figure 4B:
FIG. 4B is an image embedded using low-frequency patterns with 1024 code vectors.

In the case of the LF embedder, SNR is improved by more than 4.5 dB. This improvement is made all the more significant because the low-frequency watermark patterns (source messages) of this algorithm are highly visible. FIGS. 4A and 4B show the qualitative improvement obtained in one image (chosen at random). The LF embedder using 1 code vector in FIG. 4A produces unacceptable fidelity, while the fidelity obtained using 1024 code vectors in FIG. 4B is much better. Because these watermark patterns concentrate all their energy in the low frequencies, they should be very robust against high frequency noise introduced by such processes as JPEG compression.

In summary, in accordance with the teachings of the present invention, a simple modification is provided to a watermarking system where a source message (watermark) is represented by several code vectors, rather than by just one vector. Since the watermark detector compares correlation-coefficients with a predetermined threshold to determine whether or not the sources message is present, the result is a detection region that is the union of several cones, or a cone-forest. While image watermarking methods are described above, the methods may be applied to other media, such as audio.

While there has been described and illustrated a preferred embodiment of a watermark embedding and detection system, it will be apparent to those skilled in the art that further variations and modifications are possible without deviating from the spirit and broad teachings of the present invention which shall be limited solely by the scope of the claims appended hereto.

What is claimed is:

1. A method of embedding a source message as a watermark in a cover Work comprising the steps of:
   identifying a subset of a one-to-many code where each code vector in the subset corresponds to the source message
   applying an extraction process to a cover Work to obtain an extracted vector;
   searching the subset to identify the code vector that yields the highest detection value when compared against the extracted vector;
   creating a mixed vector that is perceptually close to the extracted vector with respect to the cover Work, and that obtains a predetermined robustness value when the mixed vector is compared against the identified code vector; and
   applying an inverse extraction process to the mixed vector and to the cover Work to create a watermarked Work.

2. The method of embedding as set forth in claim 1, wherein the cover Work is an image.

3. The method of embedding as set forth in claim 1, wherein the cover Work is an audio clip.

4. The method of embedding as set forth in claim 1, wherein said applying an extraction process is performed by computing the linear correlation between the cover Work and each of a set of reference patterns, each such correlation yielding one component of the extracted vector.

5. The method of embedding as set forth in claim 4, wherein said applying an inverse extraction process comprises scaling each of the reference patterns by the difference between the corresponding elements of the mixed vector and the extracted vector to obtain a plurality of scaled reference patterns; and
   adding the scaled reference patterns to the cover Work.

6. The method of embedding as set forth in claim 5, wherein the reference patterns consist of 0's, 1's, and −1's.

7. The method of embedding as set forth in claim 5, wherein the reference patterns are low frequency patterns.

8. The method of embedding as set forth in claim 1, wherein each code vector is drawn from an independent, identically-distributed Gaussian distribution.

9. The method of embedding as set forth in claim 1, wherein the detection value is obtained by normalized correlation.

10. The method of embedding as set forth in claim 1, wherein the detection value is obtained by correlation coefficient.

11. The method of embedding as set forth in claim 1, wherein the robustness value ($r^2$) is obtained by the equation $$r^2 = \left(\frac{v \cdot w}{T|w|}\right) - v \cdot v,$$

where v is the mixed vector, w is a code vector, and T is a constant.

12. The method of embedding as set forth in claim 11, wherein the value of T depends on the quantity of code vectors in the subset.

13. The method of embedding as set forth in claim 1, wherein said searching is performed by exhaustive search.

14. The method of embedding as set forth in claim 1, wherein said creating a mixed vector is performed by minimizing the Euclidian distance between the mixed vector and the extracted vector, while maintaining the predetermined robustness value unchanged.

15. The method of embedding as set forth in claim 14, wherein said minimizing is performed by exhaustive search.

16. The method of embedding of claim 15, wherein the exhaustive search comprises the steps of
   identifying an X, Y plane by letting $$X = \frac{w}{|w|}$$

$$Y = \frac{v - X(v \cdot X)}{|v - X(v \cdot X)|};$$

projecting the code vector w and the extracted vector v onto the X, Y plane by letting $x_w=1$ $y_w=0$ $x_v=v \cdot X$ $y_v=v \cdot Y;$ stepping through several values of y between 0 and $y_v$, letting $$x = \sqrt{\frac{T^2(r^2 - y^2)}{1 - T^2}}$$

and identifying the such x, y pair $x_m$, $y_m$ with minimum Euclidian distance between $x_m$, $y_m$ and $x_v$, $y_v$; and
   obtaining the mixed vector $v_m$ by computing $v_m = x_m X + y_m Y.$ 17. A method of detecting a message in a Work comprising the steps of
   applying an extraction process to the Work to obtain an extracted vector;
   searching a one-to-many code to find a code vector that yields the highest detection value when compared against the extracted vector; and
   identifying a message which has a corresponding subset of the one-to-many code containing the found code vector.

18. The method of detecting as set forth in claim 17, wherein the Work is an image.

19. The method of detecting of claim 17, wherein the Work is an audio clip.

20. The method of detecting as set forth in claim 17, wherein said extraction process is performed by computing the linear correlation between the Work and each pattern of a set of reference patterns, each such correlation yielding one component of the extracted vector.

21. The method of detecting as set forth in claim 20, wherein the reference patterns consist of 0's, 1's, and −1's.

22. The method of detecting as set forth in claim 20, wherein the reference patterns are low frequency patterns.

23. The method of detecting as set forth in claim 17, wherein each watermark pattern in the one-to-many code is drawn from an independent, identically-distributed Gaussian distribution.

24. The method of detecting as set forth in claim 17, wherein the detection value is obtained by normalized correlation.

25. The method of detecting as set forth in claim 17, wherein the detection value is obtained by correlation coefficient.

26. The method of detecting as set forth in claim 17, wherein said searching is performed by exhaustive search.

27. The method of detecting as set forth in claim 17, further comprising the step of reporting that the Work contains the message if the highest detection value is at least equal to a predetermined detection threshold, and reporting that the Work does not contain a message if the highest detection value is below a predetermined detection threshold.

28. The method of detecting as set forth in claim 27, wherein the Work is an image.

29. The method of detecting of claim 27, wherein the Work is an audio clip.

30. The method of detecting as set forth in claim 27, wherein said extraction process is performed by computing the linear correlation between the Work and each pattern of a set of reference patterns, each such correlation yielding one component of the extracted vector.

31. The method of detecting as set forth in claim 30, wherein the reference patterns consist of 0's, 1's, and −1's.

32. The method of detecting as set forth in claim 30, wherein the reference patterns are low frequency patterns.

33. The method of detecting as set forth in claim 27, wherein each watermark pattern in the one-to-many code is drawn from an independent, identically-distributed Gaussian distribution.

34. The method of detecting as set forth in claim 27, wherein the detection value is obtained by normalized correlation.

35. The method of detecting as set forth in claim 27, wherein the detection value is obtained by correlation coefficient.

36. The method of detecting as set forth in claim 27, wherein said searching is performed by exhaustive search.

* * * * *